March 9, 1926.

V. MASSACESE

FURNITURE SPRING

Filed July 14, 1925

1,576,441

WITNESSES

INVENTOR
Vincenzo Massacese
BY
ATTORNEYS

Patented Mar. 9, 1926.

1,576,441

UNITED STATES PATENT OFFICE.

VINCENZO MASSACESE, OF NEW YORK, N. Y.

FURNITURE SPRING.

Application filed July 14, 1925. Serial No. 43,576.

*To all whom it may concern:*

Be it known that I, VINCENZO MASSACESE, a citizen of the United States of America, and a resident of the city of New York, borough of Manhattan, in the county and State of New York, have invented a new and Improved Furniture Spring, of which the following is a full, clear, and exact description.

This invention relates to furniture springs and pertains more particularly to an improvement in springs for beds, couches, or the like, and of the type which includes a plurality of volute spring elements, the upper and larger end convolutions of which are connected and braced by suitable coil spring connecting elements.

Heretofore these connecting elements, which are preferably in the nature of crossed coiled contractile springs, are connected to the larger end convolutions of the volute springs in such a manner as to allow for relative circumferential shifting of the former with respect to the latter, which results in a clashing noise, in addition to the failure of the spring structure to properly support the weight of the user. To overcome this, radial offset portions have been provided in the larger end convolutions of the volute spring within which the terminals of the cross contractile springs are engaged.

The present invention comprehends the provision of means for locking the looped terminals of the cross springs within the radial offset portions, which means consists of an arcuate link, the bight-shaped ends of which link engage the periphery of the volute spring convolution opposite to the concave side of the offset loops with the connecting or side arms of the link embracing the portion of the looped terminals of the springs which lie within the offset loops.

The invention furthermore aims as its principal object to provide a retaining means for holding the looped terminals of the springs within the offset terminals of the end convolution of the volute spring, which means is extremely simple in its construction, inexpensive to manufacture and apply, and which is highly efficient in its purpose.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1:
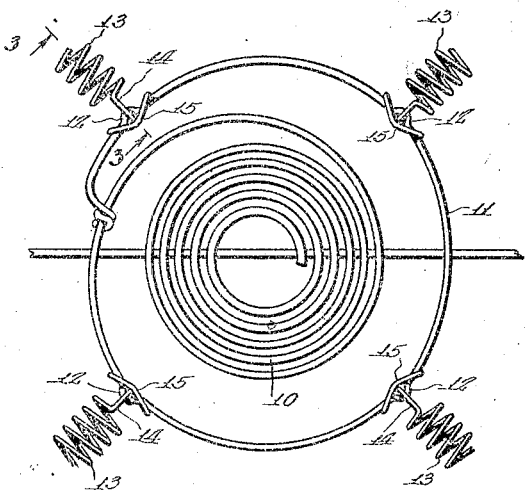
Figure 1 is a plan view illustrating the connection between the cross or connecting springs and the volute spring, which connection is constructed in accordance with the invention.

Referring to the drawings by characters of reference, 10 designates generally a volute spring and 11 the upper largest end convolution which is formed with the radial offset loops 12, the adjacent volute springs being correspondingly formed, whereby connecting coiled contractile springs 13, having their looped terminals 14 engaged within said offset loops, tie or connect the upper ends of the volute springs together to hold the same in the same plane and to cause the volute springs to function in unison.

Figure 2:
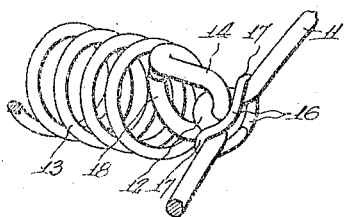
Fig. 2 is a fragmentary perspective view of the connection and retaining means.
Figure 3:
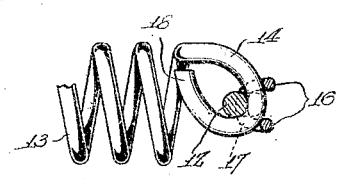
Fig. 3 is a fragmentary sectional view thereof.

As heretofore set forth, the gist of the present invention resides in the particular form of retaining element designated generally by the reference character 15, which serves to effectually retain the looped terminals 14 within the offset loops 12 so that relatively circumferential movement of the terminals 14 with respect to the convolution 11 is positively precluded. The retaining element or device 15 consists of an arcuate-shaped link which comprises arcuate side arms 16 joined by integral bight-shaped ends 17. The ends 17 embrace the periphery of the convolution 11 on the opposite side of which the concave portion of the offset loops 12 is disposed, while the arcuate arms 16 embrace the portions of the loops or terminals 14 which are arranged within the concave side of the offset loops 12. The links or elements 15 may be split links, the terminals of which are joined together by welding or in any other suitable manner. After the initial engagement of the terminals or loops 14 of the springs 13 in the offset loops 12, the said links may be made solid initially, and the terminals 14 engaged after the placement of the links or devices 15 with the terminals 18 of the loops 14 opened and subsequently bent in place, as illustrated in Fig. 2.

From the foregoing it will thus be seen that a retaining means for holding the terminal loops of the springs 13 within the offset looped portions 12, has been devised, which effectually prevents displacement and relative circumferential movement of the spring terminals 13 with respect to the convolutions 11 of the volute springs 10, which retaining means is in the form of links or other devices which are extremely simple and inexpensive both in structure and mode of connection.

What is claimed is:

1. In a volute furniture spring having a plurality of radial offset receiving loops for the looped terminals of connecting coiled contractile springs, retaining means for holding said looped terminals in the offset loops, comprising an arcuate link.

2. In a volute furniture spring having a plurality of radial offset receiving loops for the looped terminals of connecting coiled contractile springs, retaining means for holding said looped terminals in the offset loops, comprising an arcuate link, said arcuate link including arcuate side arms and connecting bights at the ends of the arms.

3. In a volute furniture spring having a plurality of radial offset receiving loops for the looped terminals of connecting coiled contractile springs, retaining means for holding said looped terminals in the offset loops, comprising an arcuate link, said arcuate link including arcuate side arms and connecting bights at the ends of the arms, said arcuate side arms engaging around the ends of the terminal loops and the connecting bights engaging the opposite periphery of the end convolution of the volute spring at the juncture of the radial offset receiving loops thereof.

4. In a volute furniture spring having a plurality of radial offset receiving loops for the looped terminals of connecting coiled contractile springs, retaining means for holding said looped terminals in the offset loops, comprising an arcuate link, said arcuate link including arcuate side arms and connecting bights at the ends of the arms, said arcuate side arms engaging around the ends of the terminal loops and the connecting bights engaging the opposite periphery of the end convolution of the volute spring at the juncture of the radial offset receiving loops thereof, whereby the said terminals are permitted free vertical and lateral rocking movement in the offset receiving loops.

VINCENZO MASSACESE.